United States Patent [19]

Isalski et al.

[11] 4,338,108
[45] Jul. 6, 1982

[54] PROCESS FOR THE RECOVERY OF ARGON

[75] Inventors: Wieslaw H. Isalski, Sale; Gregory J. Ashton, Stockport, both of England

[73] Assignee: Petrocarbon Developments Ltd., Manchester, England

[21] Appl. No.: 166,834

[22] Filed: Jul. 8, 1980

[30] Foreign Application Priority Data

Jul. 12, 1979 [GB] United Kingdom ............... 7924348

[51] Int. Cl.³ .............................................. F25J 3/02
[52] U.S. Cl. ........................................ 62/22; 62/31; 62/40; 62/28
[58] Field of Search ................... 62/31, 40, 22, 24, 28

[56] References Cited

U.S. PATENT DOCUMENTS

| | | | |
|---|---|---|---|
| 2,960,476 | 11/1960 | DuBois Eastman et al. | 62/22 |
| 2,990,690 | 7/1961 | Martin | 62/22 |
| 2,993,342 | 7/1961 | Koble | 62/22 |
| 3,037,359 | 6/1962 | Knapp | 62/22 |
| 3,805,537 | 4/1974 | Forg et al. | 62/22 |

FOREIGN PATENT DOCUMENTS

| | | |
|---|---|---|
| 1048937 | 1/1959 | Fed. Rep. of Germany . |
| 1950387 | 10/1969 | Fed. Rep. of Germany . |
| 966725 | 8/1964 | United Kingdom . |
| 1288947 | 9/1972 | United Kingdom . |

OTHER PUBLICATIONS

Argon Recovery: Aid to Ammonia Economies, Journal of Chemical Engineering, 16 Jul. 1979, pp. 62, 63.

Primary Examiner—Norman Yudkoff
Attorney, Agent, or Firm—Curtis, Morris & Safford

[57] ABSTRACT

Argon is recovered from a tail gas stream remaining after recovery of hydrogen values from ammonia synthesis purge gas. In a first step, tail gas is cooled, preferably in a first heat exchanger then a refluxing exchanger, to separate a condensate containing methane, argon and some nitrogen and uncondensed gas containing substantially all residual hydrogen and some nitrogen. The condensate, after expansion, is fed into a first distillation column where methane is condensed, the overhead nitrogen and argon product being fed to a second column where argon product is condensed. The cold requirements of the process and heat for reboil and cooling for reflux for the columns are provided by an open cycle supplied with gaseous nitrogen from the second column as heat transfer fluid. Cooling for the refluxing exchanger is provided by an evaporating coolant comprising transfer fluid combined with the uncondensed nitrogen-hydrogen gas after expansion thereof.

14 Claims, 1 Drawing Figure

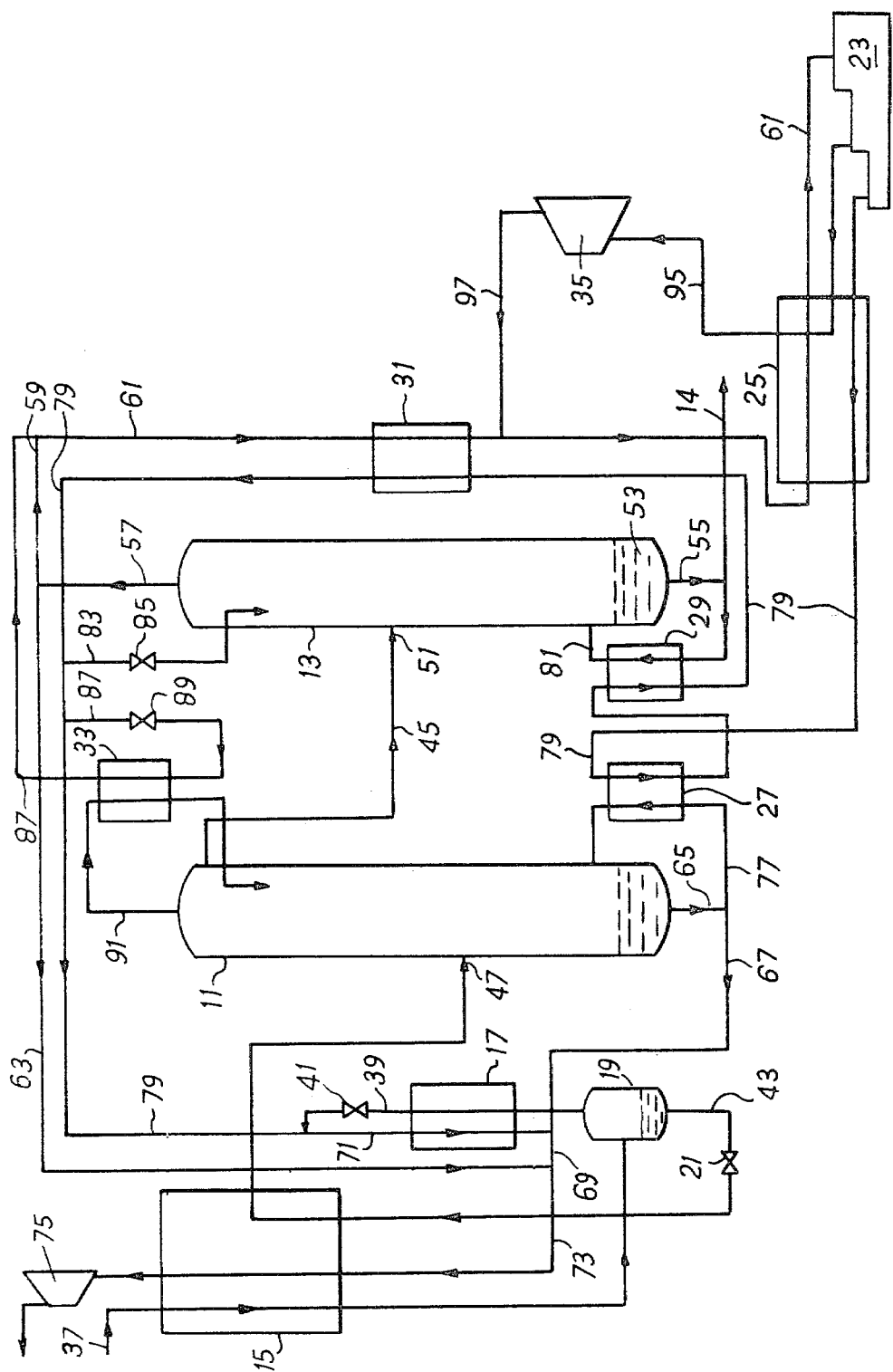

PROCESS FOR THE RECOVERY OF ARGON

This invention relates to a process for the recovery of argon from a tail gas stream remaining after treating an ammonia synthesis purge gas for the recovery therefrom of hydrogen values. The synthesis of ammonia from hydrogen and nitrogen is generally not pursued to completion and therefore some of the nitrogen and hydrogen remain unreacted. It is therefore desirable to recover and recycle these unreacted gases to the ammonia synthesis reactor.

However, the nitrogen and hydrogen used in the synthesis of ammonia generally contain inerts of which the most common are methane and argon and these inerts would therefore accumulate in the plant as the process proceeds unless steps are taken to remove them at approximately the same rate as they are introduced to the reaction zone. Accordingly, a purge stream is bled from the recycle stream. After removal of any residual ammonia, and in some cases water vapour, the purge stream typically has the following approximate composition: hydrogen 61–64 mol%, nitrogen 20–23 mol%, methane 10–13 mol% and argon 3–5 mol%. Thus, ammonia purge gas typically contains four to five times as much argon as does air and, with the present growing demand for argon to be used in a variety of metallurgical operations, such as welding, attempts have been made to find a commercially viable method for separating argon from purge gas.

A combination of factors renders the production of pure argon from ammonia purge gas more difficult than its production from air. First, the composition of the purge gas is not constant, but varies e.g. according to the state of the catalyst in the ammonia synthesis plant, whereas the composition of air is constant. Secondly, the purge gas has four main constituents, apart from ammonia, while air has only three. Thirdly, for the conventional method for the recovery of argon from air the use of a double distillation column to separate the three constituents is practicable because the boiling points of the constituents are quite close, whereas if such a column were used for the recovery of argon from purge gas, the power consumption would be relatively much greater because of the relatively large temperature difference between the boiling points of nitrogen (77.3 K.) and methane (112 K.) and consequently such a recovery operation would be more expensive.

Nowadays, many of the larger ammonia plants include hydrogen recovery units which treat the purge gas to recover the hydrogen values therefrom. These units normally separate a major proportion of the hydrogen contained in the purge gas, e.g. for recycle to the ammonia reactor, by a conventional separation method such as cryogenic separation or adsorption. The tail gas remaining after treatment of the purge gas for the recovery of hydrogen is at a low superatmospheric pressure and generally still contains a small proportion of hydrogen which, because of its low boiling point, would inhibit reflux in distillation columns used to separate the three major constituents for the recovery of argon. Thus, extraction of the residual hydrogen is desirable, and various methods have been used for this. For example, in one process where argon, nitrogen and methane are separated in a pair of distillation columns, a further auxiliary column serves to remove the residual hydrogen. The tail gas from a hydrogen recovery unit is fed to the auxiliary column, which delivers a hydrogen-nitrogen overhead product containing substantially all the hydrogen, and as bottoms product the ternary mixture of argon, nitrogen and methane, which is then fed to the pair of columns for separation. The provision of a third column is an expense which is to be avoided if possible and alternative methods for removing the hydrogen have been sought. One proposal has been to cool the incoming tail gas in a series of heat exchangers in countercurrent to fractionation products, thereby condensing the gas apart from the hydrogen component. The condensate would then be supplied to the pair of distillation columns. However, a small amount of hydrogen would dissolve in the condensate, and this would effectively preclude the formation of reflux in the subsequent columns, rendering the process inoperable or at least unacceptably inefficient.

Processes have been proposed where a purge gas stream containing mainly hydrogen and at a pressure of 50–80 atm is treated by fractionation in two or more columns for the recovery of argon and also a synthesis gas stream. In this case the separation is designed to take place at relatively high pressure to minimise the energy required to recompress the hydrogen-nitrogen product to synthesis pressure. Such processes operating at high pressure would not be suitable for use with existing ammonia plants which include hydrogen recovery plants providing low pressure tail gas streams.

Further, the additional cost of effecting fractionation at high superatmospheric pressures is considerable compared with low superatmospheric pressure process: for example, fractionation columns operable at high pressures could be expensive, as the cost of operating at high pressure fluid refrigeration cycle would be high.

An improved process has now been found, enabling argon of high purity to be separated from the tail gas stream remaining after hydrogen has been removed from ammonia purge gas in a hydrogen recovery unit.

Accordingly, the present invention provides a process for the recovery of argon from a tail gas stream remaining after treating an ammonia synthesis purge gas for the recovery therefrom of hydrogen values, said tail gas stream being at super-atmospheric pressure and containing methane, argon and nitrogen and residual hydrogen and said process comprising:

(i) separating said tail gas stream by partial condensation into a condensate containing methane, argon and nitrogen and an uncondensed gas stream containing substantially all of the residual hydrogen in said tail gas stream, said separation being effected by cooling said tail gas stream in a plurality of heat exchange steps, in which condensed gas is separated out after at least the penultimate heat exchange step and thereafter the uncondensed gas is passed upwardly in the final heat exchange step with condensed material formed therein flowing downwards in contact with the rising gas stream and mixing with said condensed gas to form said condensate;

(ii) expanding and partially evaporating said condensate to produce a fractioning stream;

(iii) separating said fractioning stream by fractional distillation at sub-ambient temperature and super-atmospheric pressure in two distillation columns in series, wherein in the first distillation column a liquid methane stream is separated as the bottoms product and a gaseous stream containing nitrogen and argon is recovered as the overhead product and passed without an intermediate pressure reduction step to the second distillation column in which it is fractionated to produce argon as the bottoms product and a gaseous nitrogen stream as overhead product;

and wherein the heat for reboil and the cooling for reflux for the distillation columns are provided by a single heat pump cycle in which the heat transfer fluid is provided from the said gaseous nitrogen stream;

the cold requirements of the process are supplied by an open refrigeration cycle in which the refrigerant is provided from the said gaseous nitrogen stream;

and reflux in the final heat exchange step in (i) is provided by evaporation of a coolant comprising a stream containing liquid nitrogen provided from said gaseous nitrogen stream and the bubble point of which has been lowered by combining it with a gas stream obtained by expanding gas provided from the uncondensed gas stream obtained in step (i).

It will be understood that for efficient recovery of argon by the process of the invention, operating conditions will be adjusted so that the liquid methane stream separated as bottoms product in the first distillation column, and the gaseous nitrogen stream produced as overhead product in the second distillation column, will contain substantially pure methane and nitrogen, respectively.

The process is particularly applicable to a tail gas stream where the recovery of hydrogen from the purge gas to form the tail gas stream is effected by partial condensation of the purge gas, but it could also be applied to tail gas streams resulting from processes where hydrogen is removed by other means such as adsorption e.g. pressure-swing adsorption.

Preferably, cold for the reflux for the two distillation columns is provided by a cooling stream formed by expanding high pressure heat transfer fluid which has been sub-cooled by indirect heat exchange with low pressure heat transfer fluid, after liquefaction thereof in providing heat for reboil for the columns.

Step (i) of the process is generally effected by cooling in two heat exchange steps. Also, cold for cooling the tail gas stream in step (i) is preferably provided by passing, in indirect heat exchange relationship therewith, a combined stream comprising liquid methane withdrawn from the first column, said coolant, and the balance of the gaseous nitrogen stream after the removal therefrom of gas to provide the heat transfer fluid for the heat pump cycle and the refrigerant for the refrigeration cycle. This combined stream is suitable for use as a fuel gas and may be compressed if necessary, after evaporation thereof, to fuel gas pressure.

Advantageously, heat for the partial evaporation of the condensate formed in step (i) is provided from said tail gas by indirect heat exchange.

High pressure heat transfer fluid, before providing heat for reboil for the columns, is conveniently cooled in indirect heat exchange with low pressure heat transfer fluid.

Where the incoming tail gas is provided at near ambient temperature, it is preferably provided at an initial pressure of from 4 to 7 atmospheres.

The pressure of the fractioning stream as supplied to the first distillation column is preferably in the range 1.2–3.0 atmospheres for a temperature in the range 95 to 105 K., and, in this case, with the pressure in both columns also being approximately in the above range, the temperature of the gaseous argon and nitrogen product fed into the second column will generally be between 80 K. and 90 K. Thus, for a pressure in the columns of about 1.8 atm. the temperatures of the product streams containing, respectively, methane (bottoms product of the first column), argon (bottoms product of the second column) and nitrogen (overhead product of the second column) are accordingly in the ranges 116 K. to 122 K., 90 K. to 96 K. and 80 to 86 K.

The proportion of the gaseous nitrogen stream withdrawn from the overhead product from the second column for use as the heat transfer fluid in the heat pump cycle is suitably from 45 to 80%, and preferably about 40 to 60% of this is subsequently compressed to provide reflux and reboil for the columns at the above temperatures and pressures, and 60 to 40% is expanded with the performance of external work to supply the cold requirements of the process.

In general, the heat transfer fluid will be compressed to from 26 to 29 atm and the fluid employed in the open refrigeration cycle will be compressed to an intermediate pressure e.g. from 7 to 12 atm and then expanded to from 1.5 to 2 atm to provide the cold for the process.

It is an advantage of the invention that the whole process can be carried out at sub-critical pressures and even the maximum pressure of the heat transfer fluid need not be supercritical. In the preferred embodiment, the heat transfer fluid is substantially pure nitrogen at a pressure of 26 to 29 atm, which is below the critical pressure for nitrogen of 34 atm. In consequence, the heat transfer fluid can be liquefied to provide reboil for the columns, and subsequently evaporated in providing cooling.

The invention will now be described in greater detail with reference to one embodiment thereof and with the aid of the accompanying drawing. Referring to the drawing, 11 and 13 are two distillation columns in which a stream consisting substantially of methane, argon and nitrogen is separated and liquid argon product is delivered from the second column in pipe-line 14. Heat exchangers 15 and 17 cool incoming tail gas to produce a condensate in separator 19 which is expanded in valve 21 and fed into first distillation column 11. A heat pump cycle provides reflux and reboil for the columns with the aid of multistage compressor 23 and heat exchangers 25, 27, 29, 31 and 33. The cold requirements of the process are supplied by a refrigerant which is compressed in compressor 23 and expanded in expander 35.

The operation of the process for the embodiment illustrated is as follows.

A tail gas stream at near ambient temperature and superatmospheric pressure enters heat exchanger 15 through pipe-line 37. The tail gas is supplied from a hydrogen-recovery unit (not shown) in which a purge gas stream from an ammonia synthesis plant (not shown) is treated for the recovery therefrom of hydrogen, suitably by cryogenic separation. The tail gas stream, comprising residual hydrogen and also nitrogen, argon and methane, is cooled in a first heat exchange step in exchanger 15 to condense a portion of the condensible components in the stream. The condensed liquid flows directly into separator 19, whilst the residual gas stream, containing mainly nitrogen and argon with the residual hydrogen and any uncondensed methane, is passed upwardly through line 39. This stream is further cooled in a second heat exchange step in reflux heat exchanger 17 in which condensed material comprising argon and nitrogen formed therein flows downwards in contact with the rising gas stream. It is preferred to condense a large proportion of the condensible components of the tail gas stream e.g. substantially all the methane, during passage through heat exchanger 15, so as to keep the load on the refluxing exchanger 17 as low as possible. The refluxing heat exchanger 17, which is a multi-stream plate fin exchanger, does not merely condense the reflux but effects fractionation of the vapour stream passing up the column since the rising vapour and descending liquid approach equilibrium with each other. In consequence, very efficient separation of the hydrogen in the tail gas stream is achieved and a condensate can be obtained in separator 19 which contains such an insignificant proportion of hydrogen that subsequent refluxing and separation in the fractionation columns can be efficiently effected. The resulting gaseous stream in line 39, containing substantially all of the residual hydrogen and some nitrogen, passes upwardly to expansion valve 41. After expansion in valve 41 the gaseous stream is combined in line 71 with a liquid nitrogen stream from line 79 to form a coolant stream. The coolant stream in line 71 passes through heat exchanger 17 at a pressure such that the bubble point of the liquid nitrogen is lowered in heat exchanger 17 and nitrogen is evaporated thereby providing the cold for cooling the stream in line 39. The exchanger will normally be enclosed in a cold box containing nitrogen at a low superatmospheric pressure and as a result of the lowering of the boiling point within the heat exchanger there is the risk that nitrogen in the cold box will condense onto the equipment and precautions should be taken to prevent this, for instance by careful insulation of the cold box in the vicinity of the exchanger.

The coolant stream, being a mixture of nitrogen and hydrogen, has a high thermal capacity and evaporates over a large temperature interval. This has the consequence that virtually all the argon in the tail gas is condensed so that the argon yield from this process can be very high, whilst substantially all the hydrogen remains uncondensed and passes upwardly from the exchanger. Argon and nitrogen condensed in exchanger 17 flow down through line 39 and into separator 19 mixing with condensed methane therein to form a condensate comprising methane, argon and nitrogen. Substantially hydrogen-free condensate comprising argon, methane and nitrogen is withdrawn from separator 19 via line 43, and after expansion in valve 21, passes through heat exchanger 15 where it is partially evaporated in indirect heat exchange with tail gas in line 37 to form a fractioning stream. The fractioning stream is then subjected to fractional distillation in the two distillation columns 11 and 13 which are at substantially the same superatmospheric pressure the only difference being normal pressure drop in connecting pipelines. The fractioning stream is fed at point 47 to an intermediate tray of a first distillation column 11 which is operated to recover liquid methane as the bottoms product and a gaseous stream containing nitrogen and argon as an overhead product. The overhead product is supplied through line 45 to second distillation column 13 at intermediate point 51. This second column is operated to recover liquid argon, 53, as bottoms product which is recovered through lines 55 and 14, and an overhead gaseous nitrogen stream which contains only a small proportion of argon and other impurities. This overhead stream is withdrawn through line 57 and a first portion is taken off via line 59 to provide fluid for the heat pump and open refrigeration cycles. The balance of the overhead is passed to line 63 and combined with methane recovered from the bottom of the first distillation column in line 71 to form a combined stream in line 73 which passes through heat-exchanger 15, where liquid in the stream is evaporated and the stream is warmed to near ambient temperature by indirect heat exchange with the incoming tail gas in line 37 and thereby cooling the latter to condense methane therefrom. The combined stream is thereafter compressed in compressor 75 to a pressure at which it is suitable for use as a fuel gas, e.g. 4 to 7 atm. Thus a fuel gas containing methane, nitrogen and hydrogen is produced as a by-product of the process.

Heat for reboil and cooling for reflux are provided for the distillation columns by a single, open heat pump cycle in which the heat transfer fluid is provided from the gaseous nitrogen stream withdrawn from the second column 13 via lines 57 and 59. A multi-stage compressor 23 compresses the heat transfer fluid, which is nitrogen of high purity, and gaseous at this point in the cycle, to the required pressure. High pressure gaseous nitrogen is delivered to a line 79, cooled by indirect heat exchange with returning low pressure heat transfer fluid in exchanger 25 and passed through a first reboil heat exchanger 27 and second reboil heat exchanger 29 in that order. In exchanger 27 nitrogen in line 79 is partially condensed in indirect heat exchange relationship with a portion of the liquid methane withdrawn from the first column via line 65 thereby evaporating the methane which is returned to the column via line 77 to produce reboil. In exchanger 29, the nitrogen gives up more heat to reboil a portion of the argon which is withdrawn from the second column via line 55 and returned to the column via line 81 as reboil. The condensed nitrogen recovered from heat exchanger 29 is then subcooled in heat heat exchanger 31 in indirect heat exchange with low pressure nitrogen in line 61 which is passing to the compressor. A first portion of the resulting subcooled liquid nitrogen is withdrawn through line 83, expanded in valve 85 and injected into second column 13 as direct reflux, and a second portion is withdrawn through line 87, expanded in valve 89 and then passed through heat exchanger 33 in indirect heat exchange with the overhead gases withdrawn from column 11 in line 91 to provide reflux for that column. The low pressure cold nitrogen gas recovered from heat exchanger 33 in line 87 is then recycled to be combined with the gas in line 59 and returned to the compressor 23 via line 61 and heat exchangers 31 and 25 in which it cools high pressure nitrogen as described above. The remainder of the subcooled liquid nitrogen in line 79, which is not used to provide reflux, is combined in line 71 with the low pressure hydrogen gas stream from line 39 as described above.

The heat pump cycle itself provides no net refrigeration, since the heat withdrawn on the low pressure side is approximately equal to, but due to inevitable cold losses generally slightly less than, the heat introduced on the high pressure side. Consequently, in accordance with the invention, refrigeration for the process is provided by an open refrigeration cycle. A suitable arrangement is illustrated in the drawing. A portion of the nitrogen fed to the compressor via line 61 is compressed to an intermediate pressure, lying between the pressure of the low pressure nitrogen in line 61 and that of the high pressure nitrogen for the heat pump cycle in line 79, withdrawn via line 95, cooled in heat exchanger 25 and expanded in expander 35, with the performance of external work, to approximately the pressure of the low pressure nitrogen in the heat pump cycle. It is then fed via line 97 into line 61, in which it combines with the low pressure nitrogen in the heat pump cycle to cool it and with which it returns to the suction side of the compressor via heat exchanger 25.

The invention is now illustrated by the following Example which employs the arrangement described above with reference to the drawing.

EXAMPLE

In this Example, purge gas is bled from a 1000 ton/-day ammonia plant at the rate of 7000 Nm$^3$ hr$^{-1}$ and is treated in a hydrogen recovery unit to yield a hydrogen product and a tail gas steam. The compositions and rate of flow of these are set out in Table 1 below:

TABLE 1

| | Purge Gas | | H$_2$ Product | | Tail Gas Stream | |
|---|---|---|---|---|---|---|
| | mole % | Nm$^3$/hr | mole % | Nm$^3$/hr | mole % | Nm$^3$/hr |
| H$_2$ | 61 | 4270 | 90 | 3886 | 15.1 | 384 |
| N$_2$ | 21 | 1470 | 8.6 | 371 | 43.2 | 1099 |
| A | 3 | 210 | 0.8 | 35 | 6.9 | 175 |
| CH$_4$ | 13 | 910 | 0.6 | 25 | 34.8 | 885 |
| NH$_3$ | 2 | 140 | — | — | — | — |
| | 100.0 | 7000 | 100.0 | 4317 | 100.0 | 2543 |

This tail gas which is at a pressure of 4–6 atmospheres and about ambient temperature is separated into an argon product stream and a fuel gas stream having the compositions and flow rates shown in Table 2 below using the apparatus illustrated in the drawing, with the distillation columns 11 and 13 operating at a pressure of between 1.5 and 2.0 atmospheres, the feed to the first distillation column being at 97 K.

TABLE 2

| | Argon Product Stream | | Fuel Gas Stream | |
|---|---|---|---|---|
| | mole % | Nm$^3$/hr | mole % | Nm$^3$/hr |
| H$_2$ | 1vpM | — | 16.2 | 384 |
| N$_2$ | 10vpm | — | 46.3 | 10.99 |
| A | 100.0 | 171 | 0.2 | 4 |
| CH$_4$ | 1vpm | — | 37.3 | 885 |
| NH$_3$ | — | — | — | — |
| | 100.0 | 171 | 100.0 | 2372 |

About 60% of the nitrogen recovered from the top of the second distillation column is fed to the compressor 23, and of this approximately 50%, compressed to a pressure of about 9.5 atmospheres in compressor 23, is employed in the refrigeration cycle and the remaining 50%, compressed to a pressure of about 27 atmospheres in compressor 23, is employed in the heat pump cycle. Of the liquid nitrogen leaving subcooler 31 in line 79, about 20% is employed in providing reflux for the second distillation column 13, about 15% is employed in providing reflux for the first distillation column 11, and the balance is fed to line 71.

Those skilled in the art will appreciate that substantial advantages in terms of cost, efficiency and controllability may be achieved by using a process according to the present invention such as that described above.

First, equipment for carrying out the process of the invention to recover argon may be added where there is already a hydrogen recovery zone associated with an ammonia synthesis plant. The tail gas in the above Example is initially at a low superatmospheric pressure of 4-6 atm and consequently relatively inexpensive distillation columns and plate fin heat exchangers will be sufficiently robust for the process. The refrigeration cycle also operates at relatively low pressures and the multi-stage compressor need compress the nitrogen only to a pressure of below 30 atm. In consequence a more reliable centrifugal-type cycle compressor can be selected, instead of a reciprocating machine which would be needed to operate at higher pressures, obviating the need for a standby compressor. The nitrogen in the cycle is at subcritical pressure and the power saving can be substantial as compared with the operation of a supercritical cycle.

The refluxing heat exchange step (carried out in exchanger 17 in the example) is one feature which promotes the desirability of the process since it is readily controllable to operate efficiently for a variety of feed temperatures and pressures, achieving almost complete condensation of the argon in the tail gas stream so that the argon yield of the process as a whole is high, and removing substantially all the hydrogen thereby allowing efficient refluxing in the fractionation columns. In addition, the initial cost of the heat exchanger is quite low. For example, a multi-stream plate fin exchanger can be provided much more cheaply than a third distillation column with trays.

The nitrogen cycle used in the process has several advantages. The cycle is open, and in the process illustrated, nitrogen in line 79 is expanded in valve 85 and injected as direct reflux into column 13. This provides a considerable saving in power consumption as compared with providing reflux by indirect heat exchange. The nitrogen in line 79 entering heat exchanger 27 is at such a temperature and pressure that it is partially condensed in the exchanger thereby providing heat for reboil for the first column. The nitrogen is then at a suitable temperature to provide reboil for the second column, providing heat by further condensation in exchanger 29. After providing reboil in series for the two columns, reflux is provided in parallel for the columns, after expansion of subcooled liquid nitrogen in valves 85 and 89, by evaporation of nitrogen.

We claim:

1. A process for the recovery of argon from a tail gas stream remaining after treating an ammonia synthesis purge gas for the recovery therefrom of hydrogen values, said tail gas stream being at super-atmospheric pressure and containing methane, argon and nitrogen and residual hydrogen and said process comprising:

(i) separating said tail gas stream by partial condensation into a condensate containing methane, argon and nitrogen and an uncondensed gas stream containing substantially all of the residual hydrogen in said tail gas stream, said separation being effected by cooling said tail gas stream in a plurality of heat exchange steps, in which condensed gas is separated out after at least the penultimate heat exchange step and thereafter the uncondensed gas is passed upwardly in the final heat exchange step with condensed material formed therein flowing downwards in contact with the rising gas stream and mixing with said condensed gas to form said condensate; and recovering said uncondensed gas stream containing substantially all of the residual hydrogen from said final heat exchange step (ii) expanding and partially evaporating said condensate to produce a fractioning stream;

(iii) separating said fractioning stream by fractional distillation at sub-ambient temperature and superatmospheric pressure in two distillation columns in series, wherein in the first distillation column a liquid methane stream is separated as the bottoms product and a gaseous stream containing nitrogen and argon is recovered as the overhead product and passed without an intermediate pressure reduction step to the second distillation column in which it is fractionated to produce argon as the bottoms product and a gaseous nitrogen stream as overhead product;

and wherein the heat for reboil and the cooling for reflux for the distillation columns are provided by a single heat pump cycle in which the heat transfer fluid is provided from the said gaseous nitrogen stream;

the cold requirements of the process are supplied by an open refrigeration cycle in which the refrigerant is provided from the said gaseous nitrogen stream;

and reflux in the final heat exchange step in (i) is provided by evaporation of a coolant passed in indirect countercurrent heat exchange relationship with said rising gas, said coolant comprising a stream containing liquid nitrogen provided from said gaseous nitrogen stream and the bubble point of which has been lowered by combining it with a gas stream obtained by expanding gas provided from the uncondensed gas stream obtained in step (i).

2. A process as claimed in claim 1, wherein cold for the reflux for the two distillation columns is provided by a cooling stream formed by expanding high pressure heat transfer fluid which has been liquefied in providing heat for reboil for the columns and subsequently subcooled by indirect heat exchange with low pressure heat transfer fluid.

3. A process as claimed in claim 1, wherein step (i) is effected by cooling in two heat exchange steps.

4. A process as claimed in claim 1, wherein cold for cooling the tail gas stream in step (i) is provided by passing in indirect heat exchange relationship therewith a combined stream comprising liquid methane withdrawn from the first column, said coolant, and the balance of the gaseous nitrogen stream after the removal therefrom of gas to provide the heat transfer fluid for the heat pump cycle and the refrigerant for the refrigeration cycle.

5. A process as claimed in claim 4, wherein said combined stream is compressed, after evaporation thereof, to fuel gas pressure.

6. A process as claimed in claim 1, wherein heat for the partial evaporation required by step (ii) is provided from said tail gas by indirect heat exchange.

7. A process as claimed in claim 1, wherein high pressure heat transfer fluid, before providing heat for reboil for the columns, is cooled in indirect heat exchange with low pressure heat transfer fluid.

8. A process as claimed in claim 1, wherein the recovery of hydrogen from the purge gas to form the tail gas stream is effected by partial condensation of the purge gas.

9. A process as claimed in claim 1, wherein said tail gas stream is initially at near ambient temperature and a pressure in the range 4 to 7 atmospheres.

10. A process as claimed in claim 1, wherein the fractioning stream as supplied to the first distillation column is at a pressure in the range 1.2 to 3.0 atmospheres and a temperature in the range 95 to 105 K.

11. A process as claimed in claim 10, wherein the pressure in the columns is about 1.8 atmospheres.

12. A process as claimed in claim 1, wherein from 45% to 80% of the gaseous nitrogen stream withdrawn from the overhead product from the second column provides the heat transfer fluid in the heat pump cycle and refrigerant.

13. A process as claimed in claim 12, wherein 40 to 60% of that portion of the gaseous nitrogen stream withdrawn for use as the heat transfer fluid and refrigerant is compressed to provide reflux and reboil for the columns, and 60 to 40% is expanded with the performance of external work to supply the cold requirements of the process.

14. A process as claimed in claim 1, wherein the heat transfer fluid is compressed to a pressure in the range 26 to 29 atmospheres, and the refrigerant in the open refrigeration cycle is compressed to a pressure in the range 7 to 12 atmospheres and subsequently expanded to a pressure in the range 1.5 to 2 atmospheres to provide the cold for the process.

* * * * *